Sept. 22, 1936.　　　R. J. McLEOD　　　2,055,132
GEAR SHAPING MACHINE
Filed Sept. 17, 1935　　　4 Sheets-Sheet 2

INVENTOR
Robert James McLeod
by Byrnes, Stebbins & Blenko
his attorneys

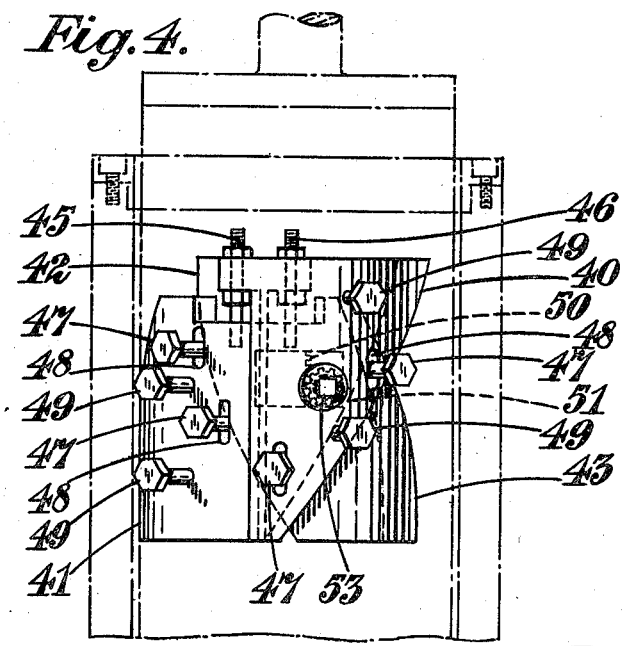
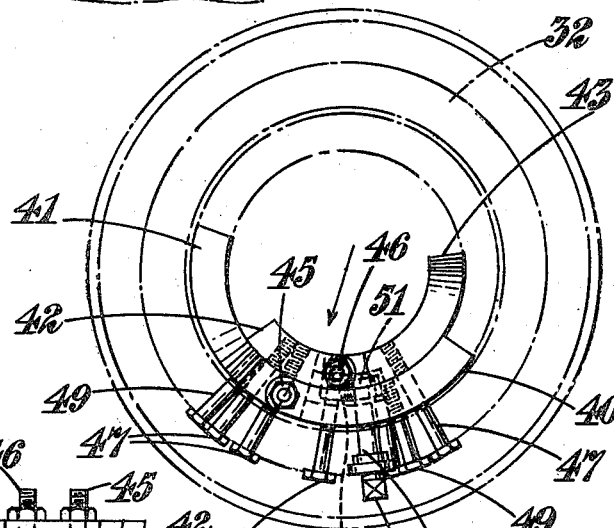
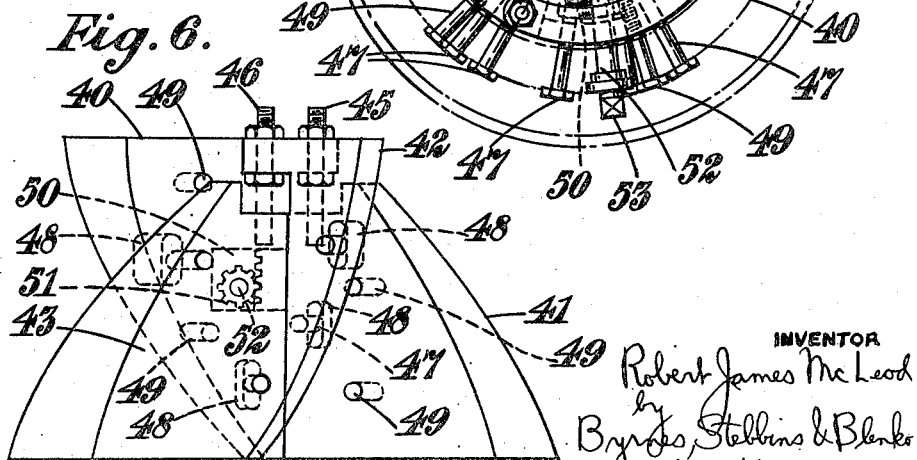

Sept. 22, 1936.      R. J. McLEOD      2,055,132
GEAR SHAPING MACHINE
Filed Sept. 17, 1935      4 Sheets-Sheet 4
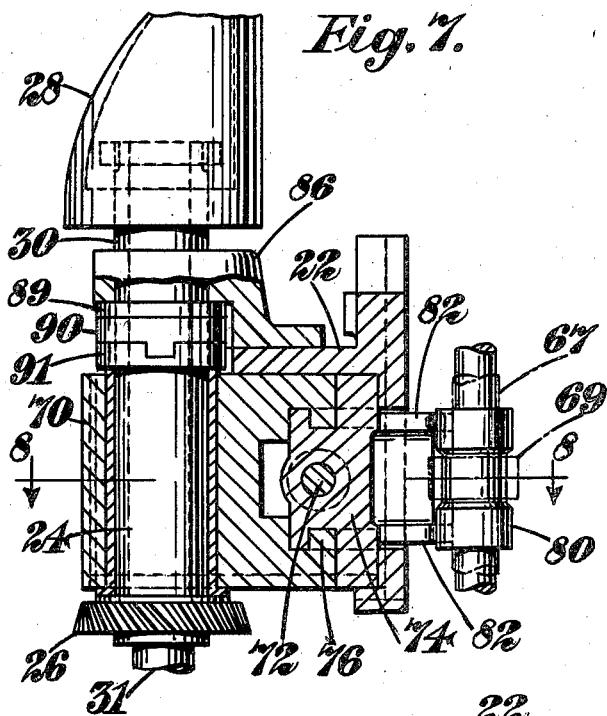
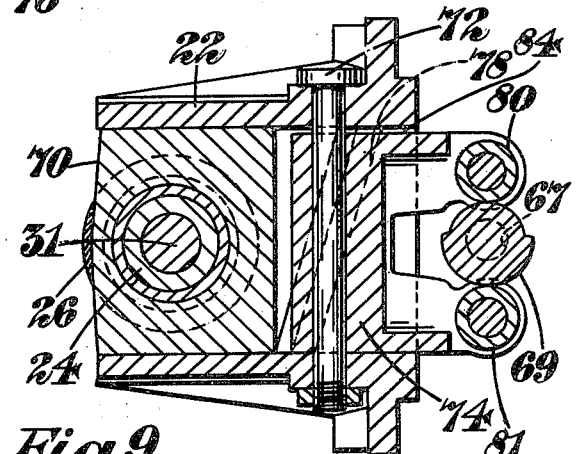
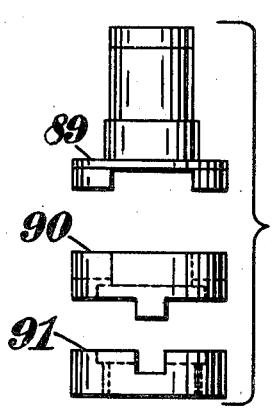
INVENTOR
Robert James McLeod
by Byrnes, Stebbins & Blenko
his attorneys

Patented Sept. 22, 1936

2,055,132

UNITED STATES PATENT OFFICE 2,055,132

GEAR SHAPING MACHINE

Robert James McLeod, West Drayton, England

Application September 17, 1935, Serial No. 40,941
In Great Britain March 7, 1935

11 Claims. (Cl. 90—9)

This invention comprises improvements in or relating to gear-cutting machines of the type wherein pinion-shaped cutters are employed for cutting helical gears, particularly double helical gears, which cutters are reciprocated in the direction of their longitudinal axis and are simultaneously rotated about said axis.

For the purpose of rotating the pinion-shaped cutters during their reciprocation, it has heretofore been the practice to employ two cylindrical guides with helical cam-paths formed thereon, which guides were arranged spaced apart coaxially with the shaft of one guide passing through the shaft of the other, which guides were united each to its own cutter by means of their shafts, and were oscillated due to the fact that each guide slid endwise through a co-operating member engaging its helical cam.

In this known construction, the outer guide governs the outer or more remote cutter and the inner guide governs the near-by cutter; now to connect the outer guide to the remote cutter, a long connecting shaft is necessary, which shaft must be small enough in diameter to pass through the shaft connecting the inner guide and its cutter, and must also pass through the inner cutter spindle. The combination of excessive length and small diameter gives undesirable flexibility to this connecting shaft so that the amount of "cut" possible with the cutter is limited and the accuracy of the spiral angle is also affected by the flexure of this connecting shaft.

Each of the pinion-shaped cutters, together with its helical guide, needs to be continuously rotated during the shaping operation by a movement superposed upon the oscillation due to the helical guides and to an extent which corresponds with the gradual rotation of the blank so that the shaping operation will proceed all round the blank. This gradual rotation is ordinarily provided by two worm wheels on the mounting of the member in which the guides work, the worm wheels being engaged by worms which are rotated by mechanism operatively connecting them to the means for rotating the blank. These worm wheels are commonly referred to as indexing or dividing worm wheels, and it will be observed that each cutter is in the ordinary construction governed by its own dividing wheel. Now it is well known that errors exist in all dividing wheels, therefore the errors in division imparted to two cutters each engaged in cutting one of the helices of a double helical gear wheel will be different and may be of opposite phase.

As in a wheel and pinion with double helical teeth the teeth cut by the right hand cutter on the pinion will mesh with the teeth cut by the left hand cutter on the wheel, the two dividing wheels, each imparting their own errors to their respective cutters independently, will lead to indifferent accuracy of meshing of the combined wheel and pinion cut under such conditions.

The present invention has for one of its objects the overcoming of the above-mentioned defects. To this end, according to the present invention, there is provided in or for a gear-cutting machine of the type described, the combination of two cylindrical helical guide members connected, or for connection each with one of the cutters and arranged concentrically one within the other. Preferably, the helical guides are arranged on the same side of the longitudinal axis of the helix and crossing one another.

Conveniently, the concentric helical guide members are combined with a cylindrical housing in which the same are housed, and two abutments carried by the housing coact respectively with the helical guides of the inner and outer guide members. In this way the overall length of the mechanism is reduced and the length of the central shaft connecting the inner guide with the corresponding cutter is minimized, errors due to springiness of this shaft being thereby rendered small enough to be unobjectionable.

According to a feature of the invention, the two abutments are constituted by inner and outer guide shoes in superposed relation to the cylindrical housing. The abutments may have opposite or different angles of inclination, and they are preferably adjustable one in relation to the other within the cylindrical housing, for the purpose of taking up wear.

According to another feature of the invention, the cylindrical housing is mounted to rotate about its longitudinal axis, and is driven by means comprising a dividing wheel and train to correspond with the rotation of the work so that both the helical guide members are rotated via the one train. In this way the multiplication of errors due to the use of two indexing wheels is obviated.

In the machines as usually constructed provision is made for a small periodic transverse movement of the axis of the cutters away from the blank in order to relieve them from pressure on the blank during the return stroke after a cut has been made. According to a further feature of the present invention, means is provided for permitting the cutters to be relieved from the face of the work without shifting the axis of rotation of the cylindrical housing. This simplifies and renders more accurate the transmission of the rotary motion to the indexing wheel, thereby further improving the accuracy and simplicity of the mechanism.

Other features of the invention relating to cutter heads, in which the spindles of the cutters are mounted, will be described hereinafter.

One embodiment of the invention and modifications thereof are diagrammatically illustrated by way of example in the accompanying drawings, wherein:

Figure 3 is a sectional elevation illustrating the arrangement of the helical guide members in a horizontal gear-cutting machine;

Figure 4 is a side elevation showing one arrangement of adjustable abutments or guide shoes for controlling the rotary oscillatory motion of the helical guide members;

Figure 2:
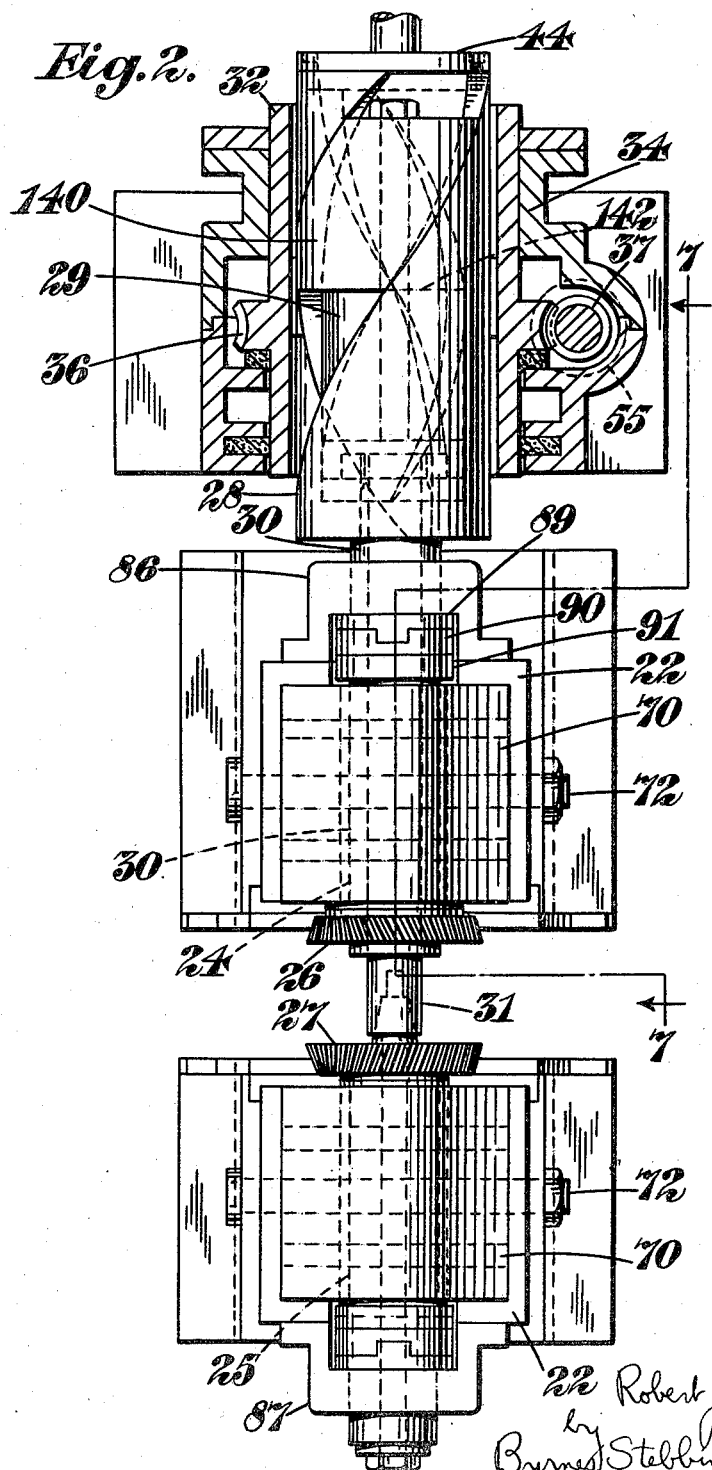
Figure 2 is a vertical section taken on the line 2—2 in Figure 1.

Figure 5 is an end elevation of the helical guide members and their outer cylindrical housing, together with the guide shoes shown in Figure 4 illustrating the method of attaching the latter to the cylindrical housing, and Figure 6 shows the adjustable guide shoes, developed, or flattened out, as viewed in the direction of the arrow shown in Figure 5, so as to illustrate better the method of fixing one to the other, the means of adjusting each to allow for wear, and the means of adjusting one in relation to the other for the purpose of adjusting the setting of the cutters in relationship to each other;

Figures 7 and 8 are respectively vertical section taken on the line 7—7 in Figure 2, and horizontal section taken on the line 8—8 in Figure 7, showing one form of means for imparting relief motion to the cutters during their return or idle stroke, and Figure 9 shows an Oldham coupling with its elements spaced apart.

Figure 1:
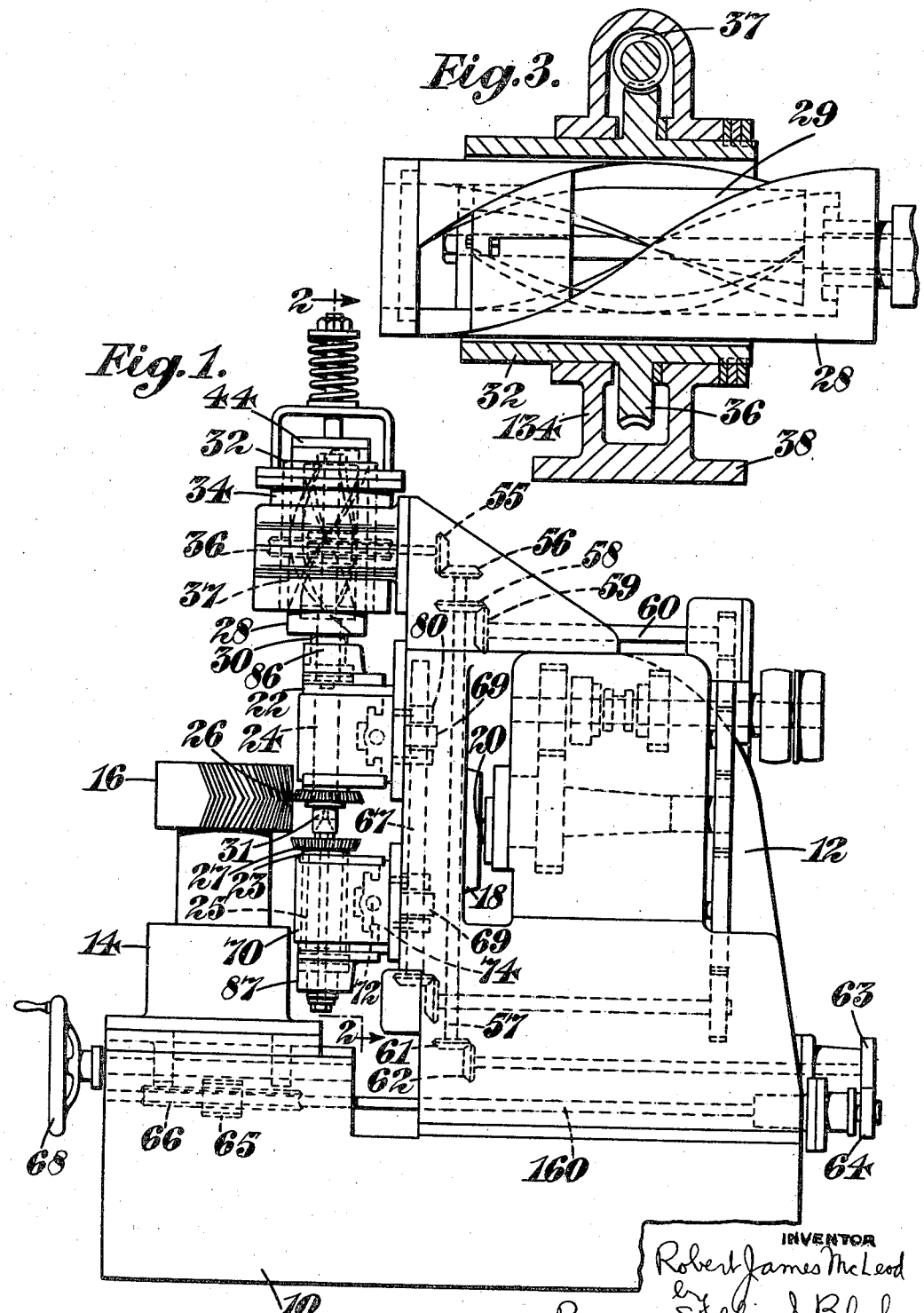
Figure 1 is a side elevation showing one form of vertical type double helical gear-cutting machine embodying the invention.

Like reference characters designate like parts throughout the several views, whereof Figures 2 to 9 are drawn to a scale larger than that of Figure 1.

Referring to the drawings, the frame of the machine shown in Figure 1 comprises a base 10 carrying an upright portion 12, wherein is arranged most of the driving mechanism, which may be of any convenient or known arrangement. The general layout of the gear-cutting machine is similar to that already well known as a Fellows gear-shaper for use in cutting straight or helical gears, and it may be disposed vertically as shown in Figure 1, or horizontally. As shown in Figure 1, the machine comprises a work-table 14 for a gear blank 16 upon which the double helical teeth are to be cut, which table is capable of gradual rotation, as described hereinafter.

Parallel with the axis of rotation of the work-table 14, there is mounted on the upright portion 12 a reciprocatory slide 18 that is driven by a crank 20 in known manner, and carries two forked heads 22, 23, in which the spindles 24, 25 of two cutting pinions 26, 27 are respectively mounted. Each of these cutters takes the form of a gear wheel with specially relieved edges to the teeth, each cutter being mounted in its head as described hereinafter.

The cutter 26 is connected to an outer helical guide member 28, shown most clearly in Figure 2, by a hollow shaft 30, and the cutter 27 is connected to an inner helical guide 29 by a solid shaft 31 which extends through the hollow shaft 30, there being a clearance between these two shafts. The exterior of the outer guide member or cam 28 is cylindrical and rotatable in a cylindrical housing 32, which is normally stationary in a bearing bracket 34 fixed on the upper end of the frame, but is permitted to rotate therein about the longitudinal axis of the two shafts 24, 25 under the control of an indexing or dividing worm wheel 36 fast on or integral with the housing 32.

The bracket 34 not only provides a journal and thrust bearing for the housing 32, but provides an outer casing for the worm wheel 36 and its driving worm 37, and will take slightly different forms according to whether the machine is vertical or horizontal. As shown in Figure 3, an outer housing 134 is provided with a foot-piece 38 which may constitute part of the base of a horizontal machine. The bracket 34 may be rigidly fixed to the frame of the machine as it and the housing 32 take no part in the relief motion of the cutters.

The outer helical guide member or cam 28 oscillates within the housing 32, and the inner helical guide member or cam 29 oscillates within the outer cam 28, and two abutments in the form of guide shoes 140, 142, fixed within the housing 32 cause this oscillatory movement when the cams are reciprocated endwise. For the sake of simplicity and clearness, the guide shoes 140, 142 are shown as non-adjustable one-piece members in Figure 2, but they are preferably adjustable and consist each of two parts, as described hereinafter.

As shown most clearly in Figure 2, the helical guide members have helical guides or cam faces arranged on the same side of the longitudinal axis of the helix and crossing one another at a situation shown near the top end of Figure 2, at which end the guide shoes 140, 142 are fixed. The outer cam 28 is a hollow cylinder having its end nearer the cutters solid, and its opposite end through which the helical slot opens, reinforced by a retaining ring 44.

As shown in Figures 4, 5 and 6, a two-part outer shoe 40, 41 is fixed by bolts 49 to the housing 32, while an inner shoe 42, 43 is fixed to the outer shoe and to the housing 32 by bolts 47 that extend through slots 48 in the outer shoe, so that the two shoes are adjustable one in relation to the other within the housing 32 along its longitudinal axis. Each of these shoes is divided in the direction of length of the housing 32 into two parts 40, 41 and 42, 43, whereof one part is adjustable in said direction in relation to the other part by means of nut-equipped studs 45, 46 which extend each through a lug on one part of a shoe and into a recessed portion of the adjacent part of the same shoe at one end thereof, so that under the influence of these studs 45, 46, adjustment of the sliding faces to the mating faces on the appropriate helical guide can be made.

In order to adjust one cutter in relation to the other so that the resulting double helical teeth may be continuous and not staggered angularly about the longitudinal axis of the gear wheel that is being cut, means may be provided for adjusting the inner abutment or guide shoe in relation to the outer. As shown in Figures 4, 5 and 6, this means is constituted by rack-and-pinion mechanism comprising a toothed rack 50 formed on the part 42 of the inner shoe and constituting a slidable key engaging the outer shoe, which rack can be shifted by a pinion 51, whereof its spindle 52 having a squared end 53 extends through the housing 32. To permit this adjustment to be made, the fixing bolts 47 for the inner shoe 42 extend through slots 48 in the outer shoe. The effect of moving one shoe in relation to the other shoe is to move, say, the inner cam round whilst the outer cam remains stationary, thus altering the position of the respective cutter.

The cylindrical housing 32 is rotatable in the bracket 34 about its longitudinal axis that is fixed in relation to the main frame of the machine, which housing 32 is arranged to be driven by driving means comprising the dividing wheel 36 and a train of gearing to correspond with the rotation of the work, so that both the helical guide members 40, 42 are rotated via the one train of gearing. As illustrated, this train comprises a pair of bevel gears 55, 56 on a vertical shaft 57, whereof the gear 55 drives the worm 37, and the gear 56 is driven by a bevel gear 58 that meshes with a companion bevel gear 59 on one end of a horizontal shaft 60. The vertical shaft 57 drives bevel gears 61 and 62 which operate change wheels 63 and 64, which change wheels in turn through shaft 160 drive the main dividing worm and wheel 65 and 66, the change wheels giving a ratio equal to a number of teeth in the cutter to the number of teeth in the blank; a hand-wheel 68 is used for turning the work-table 14 and the blank 16 on the latter. In this way the correct angular movement is imparted to the dividing wheel 36 and the housing 32 in relation to the rotation of the work-table to cut the correct number of teeth on the blank 16.

In each type of machine, whether vertical or horizontal, it is desirable for provision to be made for a small periodic transverse movement of the axis of rotation of the cutters away from the blank in order to relieve them from pressure on the blank during the return stroke after a cut has been made. Accordingly, relieving means is provided for permitting the cutters to be relieved from the face of the work without shifting the axis of rotation of the cylindrical housing, which simplifies and renders more accurate the transmission of the rotary motion to the indexing wheel, thereby further improving the accuracy and simplicity of the mechanism. As illustrated, the relieving means comprises a cam-shaft 67 carrying two cams 69, each associated with one of the cutters. As the mechanism for relieving the two cutters is the same, a description of one will suffice for both.

Referring to Figures 7, 8 and 9, a cutter carrier 70 in which the spindle 24 of the cutter 26 is journalled, is mounted to slide along the forked head 22 which has a transverse slideway in the form of a fixed rod 72 lying across the head and at right angles to the direction of movement of the cutter towards and away from the work. A sliding block 74 is movable a short distance in the head along the rod 72 and makes interlocking engagement with the adjacent forked end 76 of the carrier 70 along a slanting slideway 78. One end of this slideway 78 lies nearer the longitudinal axis of the spindle 24 than the other. The cam 69 is arranged between rollers 80, 81 carried by horns 82 on the sliding block 74 and is arranged to reciprocate the latter along the rod 72 and thereby reciprocate the cutter carrier 70 in the forked head 22 away from and towards the work. The sliding block 74 can move a distance not greater than the gap shown at 84 between it and the side of the forked head 22, and the carrier 70 moves a lesser distance during its reciprocation, depending on the angle of slant of the slideway 84.

As the helical guide members 28, 29 take no part in this relief motion, their shafts 30 and 31 connecting them with the cutters are respectively journalled in brackets 86, 87 which are rigidly fixed to the forked heads 22. To permit the relief motion being freely effected whilst at the same time maintaining the reciprocatory and oscillatory movement of the shafts 30 and 31, couplings of the Oldham type serve to connect the cutter heads with the spindles of the cutters. As shown in Figure 9, each of these couplings comprises three elements 89, 90, 91, whereof the element 89 is fixed to the respective shaft 30 or 31, the element 91 is fixed to the respective cutter spindle 24, 25 and the element 90 floats between these two elements. The three elements of each coupling will be in line during the cutting stroke and slightly out of line during the relieved idle or return stroke.

In the improved gear-cutting machine described above, it will be appreciated that owing to the relatively short lengths of the shafts connecting the helical guide members with the cutters, undesirable flexibility is avoided, and owing to one dividing wheel common to both the helical guide members being employed the defects referred to above when using two dividing wheels allotted each to one of the guide members are also avoided.

When the machine is to be employed for simultaneously cutting two single helical gears, the abutments or guide shoes 40, 42 may have the same, opposite or different angles of inclination, according to the kind of helical gears to be cut.

Various modifications may be made in the details of construction described above without departing from the invention. For example, the inclination of the helices and their abutments will be varied according to the kind of gear that is to be cut.

I claim:—

1. A gear shaping machine comprising in combination coaxial cutter spindles whereof one is rotatable within another, a work spindle parallel to the cutter spindles, gear shaper cutters mounted spaced axially apart one from another on the respective cutter spindes, reciprocatory means for reciprocating said cutter spindles axially in unison and oscillatory means for imparting angular oscillation to the cutter spindles during their reciprocation, which oscillatory means comprises helical cylindrical guide members arranged concentrically one within another and mounted on the respective cutter spindles, and abutments, one for each guide member, mounted in fixed relation thereto and arranged to coact with the helical guides thereof.

2. A gear shaping machine comprising in combination two coaxial cutter spindles whereof one is rotatable within another, a work spindle parallel to the cutter spindles, cutters mounted spaced axially apart one from another on the respective cutter spindles, reciprocatory means for reciprocating said cutter spindles axially in unison and oscillatory means for imparting angular oscillation to the cutter spindles during their reciprocation, which oscillatory means comprises two helical cylindrical guide members that are arranged concentrically one within the other, are mounted on the respective cutter spindles, and have helical guides arranged on the same side of the longitudinal axis of the guide members and cross one another, and two abutments, one for each guide member, mounted in fixed relation thereto, and arranged to coact with the helical guides thereof.

3. A gear shaping machine comprising in combination coaxial cutter spindles, whereof one is rotatable within another, a work spindle parallel to the cutter spindles, cutters mounted spaced axially apart one from another on the respective cutter spindles, reciprocatory means for reciprocating said cutter spindles axially in unison and oscillatory means for imparting angular oscillation to the cutter spindles during their reciprocation, which oscillatory means comprises helical cylindrical guide members arranged concentrically one within another and mounted on the respective cutter spindles, a cylindrical housing in which the said guide members are rotatably housed, and abutments constituted by inner and outer guide shoes, one for each guide member, attached in superposed relation to the housing and arranged to coact with the helical guides of the guide members.

4. A gear shaping machine comprising in combination two coaxial cutter spindles, whereof one is rotatable within another, a work spindle parallel to the cutter spindles, two cutters mounted spaced axially apart one from another, one on each cutter spindle, reciprocatory means for reciprocating said cutter spindles axially in unison and oscillatory means for imparting angular oscillation to the cutter spindles during their reciprocation, which oscillatory means comprises two helical cylindrical guide members arranged concentrically one within another and mounted one on each cutter spindle, a cylindrical housing in which the said guide members are rotatably housed, and two abutments constituted by inner and outer guide shoes, one for each guide member, attached in superposed relation to the housing and arranged to coact with the helical guides of the guide members, which abutments are adjustable one in relation to the other within the housing.

5. In a gear shaping machine, the combination of two coaxial cutter spindles, whereof one is rotatable within the other and both are mounted to reciprocate endwise, means for imparting reciprocation directly to both of said spindles, a single rotary member common to both spindles for imparting rotary movement to them, and concentric guiding means situated within said rotary member and operatively connecting the latter with the spindles for transmitting rotation to the same and causing an angular oscillatory movement thereof when the spindles are reciprocated, which guiding means comprises two concentric pairs of complementary members having helical cooperating surfaces.

6. In a gear shaping machine, the combination of two coaxial cutter spindles, whereof one is rotatable within the other and both are mounted to reciprocate endwise, means for imparting reciprocation directly to both of said spindles, a single rotary member in the form of a cylindrical housing common to both spindles for imparting rotary movement to them, and concentric guiding means situated within said housing and operatively connecting the latter with the spindles for transmitting rotation to the same and causing an angular oscillatory movement thereof when the spindles are reciprocated, which guiding means comprises two concentric pairs of complementary members having helical co-operating surfaces, at least one of which pairs comprises a helical cylindrical guide member fixed to a said spindle, and an abutment that is mounted on the housing and is divided in the direction of length of the latter into two parts, whereof one part is adjustable in said direction in relation to the other part.

7. In a gear shaping machine, the combination of two coaxial cutter spindles, whereof one is rotatable within the other and both are mounted to reciprocate endwise, means for imparting reciprocation directly to both of said spindles, a single rotary member in the form of a cylindrical housing common to both spindles for imparting rotary movement to them, and concentric guiding means situated within said housing and operatively connecting the latter with the spindles for transmitting rotation to the same and causing an angular oscillatory movement thereof when the spindles are reciprocated, which guiding means comprises two concentric pairs of complementary members having helical co-operating surfaces, each of which pairs comprises a helical cylindrical guide member fixed to its respective spindle, and an abutment mounted in the housing, which abutments lie in superposed relation one on the other, and means for attaching the inner abutment to the housing extending through slots in the outer abutment.

8. In a gear shaping machine, the combination of two coaxial cutter spindles, whereof one is rotatable within the other and both are mounted to reciprocate endwise, means for imparting reciprocation directly to both of said spindles, a cylindrical housing common to both spindles, and concentric guiding means situated within said housing and operatively connecting the latter with the spindles for transmitting rotation to the same and causing an angular oscillatory movement thereof when the spindles are reciprocated, which guiding means comprises two concentric pairs of complementary members having helical co-operating surfaces, each of which pairs comprises a helical cylindrical guide member fixed to its respective spindle, and an abutment mounted in the housing, which abutments lie in superposed relation one on the other, and mechanism for adjusting the inner abutment in relation to the outer in the direction of length of the housing, which mechanism comprises a toothed rack on the inner abutment, a pinion meshing with said rack, and a shaft that carries said pinion and rotatably extends through the housing.

9. A gear shaping machine comprising in combination two coaxial cutter spindles, whereof one is rotatable within the other, a work spindle parallel to the cutter spindles, two cutter carriers each supporting a cutter, couplings connecting the cutter carriers with their respective spindles so as to space the cutters axially apart one from another, reciprocatory means for reciprocating said cutter spindles axially in unison and oscillatory means for imparting angular oscillation to the cutter spindles during their reciprocation, which oscillatory means comprises helical cylindrical guide members arranged concentrically one within another and mounted on the respective cutter spindles, and abutments, one for each guide member, mounted in fixed relation thereto and arranged to coact with the helical guides thereof and relieving means for effecting a relative movement between the cutter carriers and the work spindle.

10. A gear shaping machine comprising in combination two coaxial cutter spindles, whereof one is rotatable within the other, a work spindle parallel to the cutter spindles, two cutter carriers each supporting a cutter, couplings connecting the cutter carriers with their respective spindles so as to space the cutters axially apart one from another, reciprocatory means for reciprocating said cutter spindles axially in unison and oscillatory means for imparting angular oscillation to the cutter spindles during their reciprocation, which oscillatory means comprises helical cylindrical guide members arranged concentrically one within another and mounted on the respective cutter spindles, and abutments, one for each guide member, mounted in fixed relation thereto and arranged to coact with the helical guides thereof, and relieving means for effecting a relative movement between the cutter carriers and the work spindle, which relieving means comprises two brackets one for each cutter carrier, on which brackets the carriers are slidable in a direction towards and away from the work spindle, which brackets are immovable in said direction, and cam-actuated means for reciprocating the carriers in said direction on said brackets.

11. A gear shaping machine as set forth in claim 10, wherein said relieving means comprises two rods, each carried by a said bracket, and lying transversely of the direction of sliding of said carriers, a block slidable along each rod and engaging the allotted carrier along a slanting slideway, whereof one end lies nearer the axis of rotation of the adjacent cutter than the other, and means comprising two cams, one allotted to each block, for reciprocating the blocks along the slideways and thereby reciprocating the cutter carriers in the brackets towards and away from the work spindle.

ROBERT JAMES McLEOD.